United States Patent
Tsirkin

(10) Patent No.: US 10,901,773 B2
(45) Date of Patent: Jan. 26, 2021

(54) SHARING DEVICES BETWEEN VIRTUAL MACHINES IN VIEW OF POWER STATE INFORMATION

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 89 days.

(21) Appl. No.: 16/381,072

(22) Filed: Apr. 11, 2019

(65) Prior Publication Data
US 2020/0326966 A1 Oct. 15, 2020

(51) Int. Cl.
| | |
|---|---|
| G06F 9/455 | (2018.01) |
| G06F 1/28 | (2006.01) |
| G06F 3/06 | (2006.01) |
| H04L 29/08 | (2006.01) |
| G06F 9/50 | (2006.01) |
| H04L 12/24 | (2006.01) |

(52) U.S. Cl.
CPC ............ *G06F 9/45558* (2013.01); *G06F 1/28* (2013.01); *G06F 3/065* (2013.01); *G06F 3/0635* (2013.01); *G06F 9/5044* (2013.01); *G06F 9/5088* (2013.01); *H04L 67/08* (2013.01); *G06F 2009/4557* (2013.01); *G06F 2009/45591* (2013.01); *H04L 41/0816* (2013.01); *H04L 67/1002* (2013.01); *H04L 67/1097* (2013.01)

(58) Field of Classification Search
CPC ............ H04L 67/1097; H04L 67/1002; H04L 41/0816; H04L 67/08; G06F 9/5088; G06F 9/5044; G06F 3/065; G06F 3/0635; G06F 9/45558; G06F 2009/4557; G06F 2009/45591

See application file for complete search history.

(56) References Cited

U.S. PATENT DOCUMENTS

| | | | |
|---|---|---|---|
| 9,405,347 B2 | 8/2016 | Wang et al. | |
| 10,109,099 B2 | 10/2018 | Johnson | |
| 2010/0332657 A1* | 12/2010 | Elyashev | H04L 67/1002 709/226 |
| 2011/0022812 A1* | 1/2011 | van der Linden | H04L 67/1097 711/163 |

(Continued)

OTHER PUBLICATIONS

Nelson, M., "Virtualization power management: How to save money and the Earth," 2006, 5 pages, Retrieved on Mar. 1, 2019 from: https://searchservervirtualization.techtarget.com/tip/Virtualization-power-management-How-to-save-money-and-the-Earth.

(Continued)

*Primary Examiner* — Tuan A Vu
(74) *Attorney, Agent, or Firm* — Womble Bond Dickinson (US) LLP

(57) ABSTRACT

In one implementation, a method of sharing a physical device between multiple virtual machines is provided. The method includes receiving, from a first virtual machine, a request to access a physical device of a computing device. The method also includes determining, by a processing device, whether the physical device of the computing device is available in view of power state information associated with the physical device of the computing device. The method further includes in response to determining that the physical device of the computing device is available, assigning the physical device to the first virtual machine.

20 Claims, 6 Drawing Sheets

(56) References Cited

U.S. PATENT DOCUMENTS

| | | | |
|---|---|---|---|
| 2013/0097377 A1* | 4/2013 | Satoyama | G06F 3/065 |
| | | | 711/114 |
| 2014/0229944 A1* | 8/2014 | Wang | G06F 9/5088 |
| | | | 718/1 |
| 2014/0245294 A1* | 8/2014 | Kaul | G06F 9/45558 |
| | | | 718/1 |
| 2015/0040127 A1* | 2/2015 | Dippenaar | G06F 9/5044 |
| | | | 718/1 |
| 2015/0193249 A1 | 7/2015 | van Riel et al. | |
| 2016/0179565 A1* | 6/2016 | Chen | H04L 67/08 |
| | | | 710/313 |
| 2017/0318029 A1* | 11/2017 | Furuichi | H04L 41/0816 |
| 2019/0025903 A1 | 1/2019 | Mehta et al. | |
| 2019/0250942 A1* | 8/2019 | Wang | G06F 3/0635 |

OTHER PUBLICATIONS

Posey, B., "Power Management in Hyper-V," Sep. 16, 2016, 6 pages. https://virtualizationreview.com/articles/2016/09/01/power-managment-in-hyperv.aspx.

Stoess, J., et al., "Energy Management for Hypervisor-Based Virtual Machines," 2007, System Architecture Group, University of Karlsruhe, Germany, 20 pages, Retrieved on Mar. 1, 2019 from: https://www.usenix.org/legacy/events/usenix07/tech/full_papers/stoess/stoess_html/index_old.html.

Verun, M., "Press the Easy Button: Paravirtualized Block Volume Attachments for VMs!," Mar. 2, 2018, Principal Product Manager, Oracle Cloud, 5 pages. https://blogs.oracle.com/cloud-infrastructure/paravirtualized-block-volume-attachments-for-vms.

\* cited by examiner

SHARING DEVICES BETWEEN VIRTUAL MACHINES IN VIEW OF POWER STATE INFORMATION

TECHNICAL FIELD

Aspects of the present disclosure relate to virtual environments, such as virtual machines (VMs). In particular, aspects of the present disclosure relate to sharing devices among virtual machines.

BACKGROUND

A computing device may include one or more virtual environments. One type of virtual environment may be a virtual machine (VM) that may execute on a hypervisor which executes on top of the OS for the computing device (e.g., a host OS). The hypervisor may manage system sources (including access to hardware devices, such as processors, memories, storage devices). The hypervisor may also emulate the hardware (or other physical resources) which may be used by the VMs to execute software/applications. Another type of virtual environment may be a container that may execute on a container engine which executes on top of the OS for a computing device, as discussed in more detail below. The container engine may allow different containers to share the OS of a computing device (e.g., the OS kernel, binaries, libraries, etc.), as discussed in more detail below. The container engine may also perform other functions, as discussed in more detail below.

A virtual machine may include various virtual devices (e.g., emulated devices) that may correspond to physical devices of a computing device. For example, a virtual machine may include a virtual network interface card (NIC) which may correspond to a physical network interface card of the computing device. The virtual machine may use the virtual network interface card to transmit or receive packets, messages, frames, etc. The hypervisor may use the physical network interface card to communicate the packets to and from the virtual network interface card and the physical network interface card.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
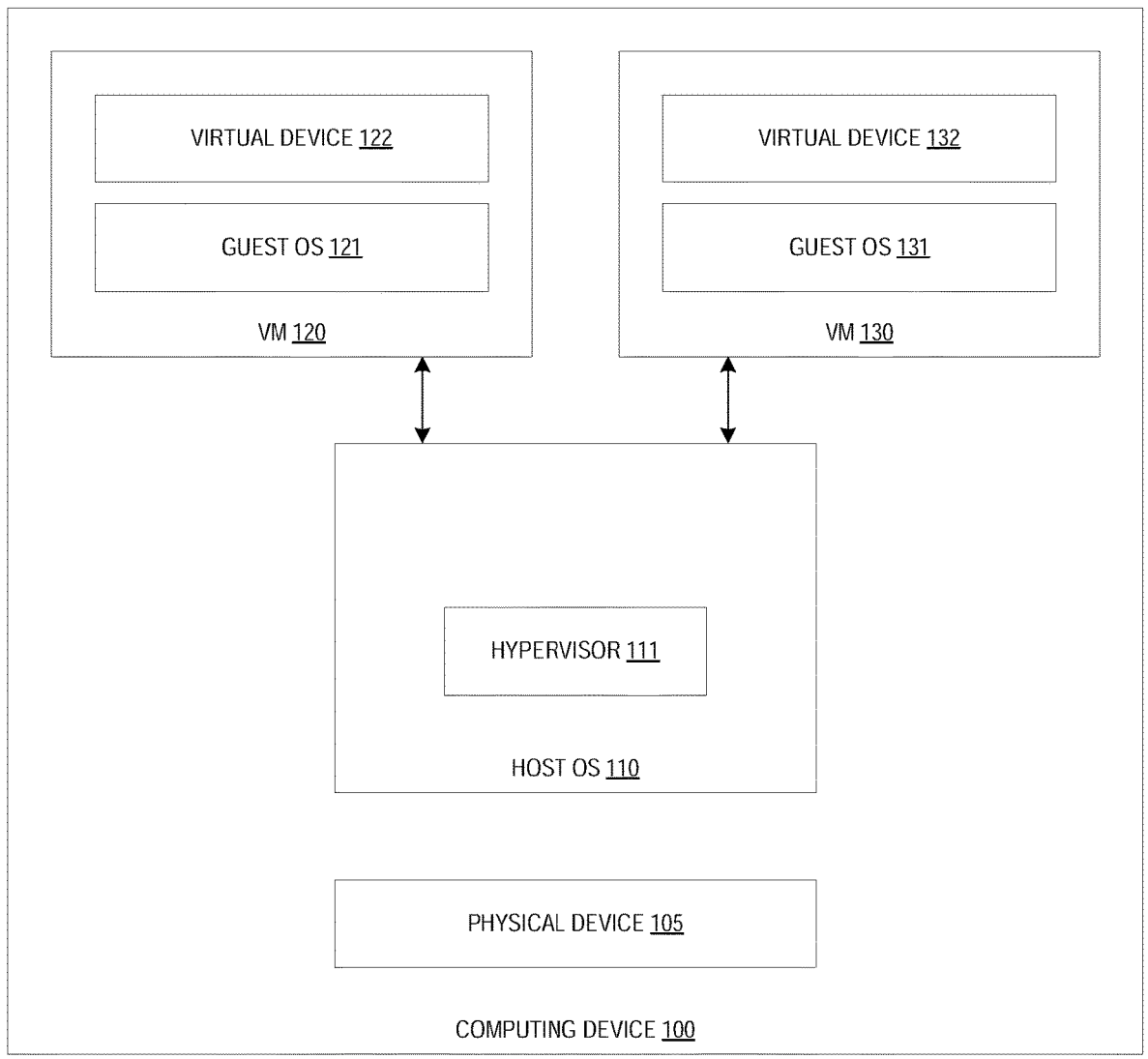
FIG. 1 is a block diagram that illustrates a computing device, in accordance with some embodiments of the present disclosure.

As discussed above, a virtual machine (VM) may execute on a hypervisor which executes on top of the OS for the computing device (e.g., a host OS). The hypervisor may manage system sources (including access to hardware devices, such as processors, memories, storage devices). The hypervisor may also emulate the hardware (or other physical resources) which may be used by the VMs to execute software/applications. A VM may include a virtual device that corresponds to a physical device (e.g., a physical component, module, etc.) of the computing device. Many types of physical devices may not be sharable between different virtual machines. Thus, if a physical device is not sharable between different virtual machines, then the physical device may not be assigned to multiple virtual machines simultaneously. For example, a physical device may be assigned to a single virtual machine at a time. Some devices may be shareable and may able to multiplex data between different virtual devices or virtual machines. For example, a peripheral component interconnect express (PCIe) device may support virtual functions that allow different virtual machines, virtual devices, or applications to share the use of the PCIe device. Data may be multiplexed between the different virtual machines, virtual devices, or applications and the PCIe device by using the virtual functions to communicate data with the PCIe device. However, these devices often have a limit on the number of virtual machines, virtual devices, or applications that may share the use of the virtual device. For example, a PCIe device may not be able to support more than eight virtual machines, virtual devices, or applications. In addition, multiplexing data communicated with a physical device between multiple virtual machines may result in modifying the guest OSes of the virtual machines. This may be a complicated and costly process, and many vendors of guest OSes may not want to modify the guest OSes.

The present disclosure addresses the above-noted and other deficiencies by using power state information to share a physical device. When virtual machines transition their respective virtual devices, that are associated with the physical device, to a reduced power state, the hypervisor may be aware that the physical device is available for other devices to use or access. For example, if all of the virtual machines have transitioned their respective virtual devices to a reduced power state, this may indicate that none of the virtual machines are currently using the physical device because a reduced power state may indicate that a virtual machine has powered down a virtual device and is not using the physical device associated with the virtual device. When one of the virtual machines requests to power on a virtual device at a later point in time, the hypervisor may be able to assign the physical device to the virtual machine because the hypervisor may be aware that none of the other virtual machines are currently using the physical device. In addition, embodiments, examples, and implementations described herein may not have a limit on the number of virtual machines that may share the use of a physical device. For example, the number of virtual machines that may share the use of the physical device may not be limited by how many virtual machines the physical device is able to support. In another example, an unlimited number of virtual machines may share the physical device.

FIG. 1 is a block diagram that illustrates a computing device 100, in accordance with some embodiments of the present disclosure. The computing device 100 includes a physical device 105, a host OS 110, a hypervisor 111, and a virtual machine (VM) 120. The computing device 100 may also include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing device 100 may comprise any suitable type of computing device or machine that has a programmable processor including, for example, server computers, desktop computers, laptop computers, tablet computers, smart-phones, set-top boxes, etc. In some examples, the computing device 100 may comprise a single machine or may include multiple interconnected machines (e.g., multiple servers configured in a cluster). The computing device 100 may execute or include a host operating system (OS) 110. The host OS 110 may manage the execution of other components (e.g., software, applications, etc.) and/or may manage access to the hardware (e.g., processors, memory, storage devices etc.) of the computing device.

As discussed above, one type of a virtual environment may be a VM 120 executing on a computing device 100. In one embodiment, the VM 120 may be a software implementation of a machine (e.g., a software implementation of a computing device) that includes its own operating system (referred to as guest OS 121) and executes application programs, applications, software. VM 120 may be, for example, a hardware emulation, a full virtualization, a para-virtualization, and an operating system-level virtualization VM.

Computing device 100 may include a hypervisor 111, which may also be known as a virtual machine monitor (VMM). In the example shown, hypervisor 111 may be a component of a host operating system 110. In another example, hypervisor 111 may run on top of a host operating system 100 (e.g., may be an application executing on the computing device 100), or may run directly on host hardware without the use of a host operating system 100. Hypervisor 111 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 111, though typically implemented in software, may emulate and export a bare machine interface to higher level software in the form of virtual processors and guest memory. Higher level software may comprise a standard or real-time operating system (OS), may be a highly stripped down operating environment with limited operating system functionality, may not include traditional OS facilities, etc. Hypervisor 111 may present other software (i.e., "guest" software) the abstraction of one or more virtual machines (VMs) that provide the same or different abstractions to various guest software (e.g., guest operating system, guest applications).

As illustrated in FIG. 1A, the VM 120 includes a virtual device 122 and VM 130 includes a virtual device 132. In one embodiment, virtual devices 122 and 132 may be emulated devices. Virtual devices 122 and 132 may correspond to physical device 105 (e.g., may be associated with physical device 105). The physical device 105 may be a physical device, component, circuit, or other hardware. For example, the physical device 105 may an encryption processor, a tensor operation processor, a graphics processing unit (GPU), etc.)

In one embodiment, the hypervisor 111 may allow the physical device 105 to be associated with both the virtual device 112 (or the VM 120) and the virtual device 132 (or the VM 130), simultaneously. For example, both VM 120 and VM 130 may be simultaneously executing, operating, etc., on the computing device 100. The physical device 105 may be associated with the virtual device 122 and the virtual device 132 while both VM 120 and VM 130 are executing, operating, etc., on the computing device 100. As discussed above, a physical device may generally not be associated with two or more VMs simultaneously without modifying a guest OS to support multiplexing of data.

In one embodiment, the guest OSes 121 and 131 may use various standards for power state information and for sending messages (e.g., commands or other data) to transition the virtual devices 122 and 132 between different power states. For example, the guest OSes 121 and 131 may use the Advance Configuration and Power Interface (ACPI) standard. The ACPI standard may define various power states for devices and may define a list of commands or formats for the commands to transition the devices to the various power states. For example, the ACPI standard includes the D0, D1, D2, and D3 power states for devices. D0 may be referred to as a fully on or operating state. D0 may be an example of an active power state. D1 and D2 may be intermediate power states where the device uses less power than in the D0 power state. D3 may be referred to as an off power state. D1 through D3, may be examples of a reduced power state. Although the present disclosure may refer to the ACPI standard, various other standards, which include different power states, may be used in other embodiments.

The VM 120 may power on the virtual device 122 and the hypervisor 111 may assign the physical device 105 to the VM 122. In one embodiment, the hypervisor 111 may receive a message from the VM 120 (or guest OS 121) indicating that the VM 120 is requesting to transition the virtual device 122 to a different power state. For example, the VM 120 may transmit a message (e.g., a command or other data) to the hypervisor 111 indicating that the VM 120 is requesting to transition the virtual device 122 from a first power state to a second power state. The first power state may be a passive power state and the second power state may be an active power state. A passive power state may be a power state which indicates that the virtual device 122 is using less power than other states (e.g., an active power state). An active power state may be a power state in which the virtual device is using more power than the reduced power state. Generally, the virtual device 122 may use more power in the second power state than the first power state.

In one embodiment, the VM 120 or the guest OS 121 may transmit the message to the hypervisor 111 indicating that the VM 120 is requesting to transition the virtual device 122 to a different power state when the guest OS 121 determines that the virtual device 122 has not be accessed or used for a period of time (e.g., a threshold period of time). For example, the guest OS 121 may determine that the virtual device 122 has not been accessed or used by any applications, processes, services, etc., of the VM 120 for the last minute, last five minutes, or some other appropriated period of time. The guest OS 121 may transmit a command (which may be defined by the ACPI standard or some other standard) to the virtual device 122 to transition the virtual device 122 from a D0 state to one of the states D1 through D3. In another embodiment, the hypervisor 111 may intercept the message transmitted by the VM 120 or the guest OS 121. For example, the guest OS 121 may be an OS that may execute or operate outside of a virtual machine. Thus, the guest OS 121 may operate as if the virtual device 122 were a physical device. When the guest OS 121 sends a message to the virtual device 122 to transition the virtual device 122 to a different power state, the hypervisor 111 may intercept or trap this message.

In one embodiment, the guest OS 121 may save device state information for the virtual device 122 when the guest OS 121 transitions the virtual device 122 to a reduced power state. For example the guest OS 121 may save information about the operations or actions that were pending on the virtual device 122. In another example, the guest OS 121 may save the data that may be used by the virtual device 122. Examples of the data that may be used by the virtual device 122 may include buffer data, register values, etc.

In one embodiment, the messages indicating that a VM is requesting to transition a virtual device to a different power state may be referred to as power state information. For example, the messages may allow the hypervisor 111 to determine the current power state of the virtual devices 122 and 132, and other virtual devices. In another embodiment, the power state information may be a table, list, or other data that indicates the current power state of the virtual devices that are associated with the physical device 105. For example, the hypervisor 111 may maintain or manage a table (e.g., power state information) that includes a list of the virtual machines and the virtual devices of the virtual machines. Each entry in the table may identify a virtual machine, a virtual device, the physical device that the virtual device is associated with, and the current power state of the virtual device.

In one embodiment, the hypervisor 111 may receive a request from the VM 130 to access the physical device 105. For example, the guest OS 131 may transmit a message to virtual device 132 to transition the virtual device 132 from a passive power state to an active power state because the guest OS 131 has determine that an application, process, service, etc., of the VM 130 is requesting to use or access the virtual device 132. The hypervisor 111 may intercept or trap the message from the VM 130 to the virtual device 132. In another example, the guest OS 131 may directly transmit the message to the hypervisor 111 indicating that the VM 130 is transitioning the virtual device 132 from a passive power state to an active power state.

The hypervisor 111 may determine whether the physical device 105 is available for the VM 130 to access or use, based on power state information. For example, the hypervisor 111 may determine whether any of the VMs are using or accessing the physical device 105 based on the messages from VMs requesting to transition respective virtual devices to different power states. In another example, the hypervisor 111 may determine may determine whether any of the VMs are using or accessing the physical device 105 based on table, a list, etc., which indicates the current power state of the different virtual devices of the different VMs. In one embodiment, the hypervisor 111 may determine that the physical device 105 is available if the power state information indicates that all of the other VMs (e.g., VM 120) have transitioned their respective virtual devices (which are associated with the physical advice 105) to a reduced power state. Because the reduced power state indicates that respective virtual devices have not been accessed or used the physical device 105 for a period of time, the hypervisor 111 may determine that the physical device 105 is not being used by other VMs (e.g., is not being used by VM 120) and may determine that the physical device 105 is available for the VM 130 to access or use.

TABLE 1

| VM Identifier | Virtual Device Identifier | Physical Device Identifier | Current Power State |
| --- | --- | --- | --- |
| VM 120 | VD 122 | PD 105 | D2 |
| VM 130 | VD 132 | PD 105 | D3 |
| VM 120 | VD 3 | PD 2 | D0 |
| VM 120 | VD 4 | PD 2 | D2 |

Table 1 above illustrates example power state information that may be maintained, updated, or used by the hypervisor 111 to determine whether a physical device is available. The first column indicates an identifier (e.g., alphanumeric text, a name, or some other appropriate value) for a VM (e.g., VM 120 or VM 130). The second column indicates an identifier for a virtual device of the VM (e.g., alphanumeric text, a name, or some other appropriate value). The third column indicates an identifier for a physical device (e.g., PD 105) of the computing device 100. The fourth column indicates the current power state of the virtual device (e.g., one or more of states D0 through D3). As illustrated in Table 1, physical device 105 is associated with virtual devices 122 and 132. Virtual device 122 is in a reduced power state (e.g., D2) and virtual device 132 is also in a reduced power state (e.g., D3). Thus, the physical device 105 is available because all of the virtual machines 122 and 132 that are associated with the physical device 105 are in a reduced power state. Also as illustrated in Table 1, physical device PD 2 is associated with virtual device VD 3 (of virtual machine 120) and virtual device VD 4 (of virtual machine 130). Virtual device VD 3 is in an active power state (e.g., D0) and virtual device VD 4 is in a reduced power state (e.g., D2). Thus, if virtual machine 130 were to request to transition virtual device VD 4 to an active power state, the hypervisor 111 may not allow VM 130 to transition virtual device VD 4 to the active power state, because the physical device PD 2 is not available (e.g., is currently being used by VM 120).

If the hypervisor 111 determines that VM 120 and other VMs (not illustrated in the figures) are not currently accessing or using the physical device 105, the hypervisor 111 may assign the physical device 105 to the VM 130. For example, the guest OS 131 may access or the use the virtual device 132 to perform various operations or functions (e.g., to perform encryption operations, tensor operations, floating point operations, etc.). The hypervisor 111 may allow the operations or functions to be forwarded to the physical device 105 or to be performed by the physical device 105 because the physical device 105 is assigned to the VM 130.

If a first VM of the computing device 100 is already using the physical device 105, the first VM that is currently using the physical device 105 may block other VMs from using the physical device 105 for a period of time, and possible indefinitely. If the first VM that is currently using the physical device 105 and the other VMs are from the same tenant (e.g., the same user or organization), the tenant may allow the first VM to continue using the physical device 105. Alternatively, the tenant may want to allow the other VMs to use the physical device 105 and may pause or stop the first VM. Regardless of whether the VMs of the computing device 100 belong to a single tenant or multiple tenants, it may be useful to provide mechanisms to allow VMs to be stopped or paused so that that the VMs do not block the use of the physical device 105 for too long a period of time, as discussed in more detail below.

In one embodiment, if the hypervisor 111 determines that VM 120 or another VM (not illustrated in the figures) is currently accessing or using the physical device 105, the hypervisor 111 may refrain from assigning the physical device 105 to the VM 130. For example, the hypervisor 111 may deny the VM 130 access to the physical device 104 or may not assign the physical device 105 to the VM 130 for a period of time, as discussed in more detail below. In one embodiment, the hypervisor 111 may transmit a message to the VM 130 indicating that the virtual device 132 is not available or usable by the VM 130. For example, the hypervisor may transmit a message to the VM 130 or guest OS 131 indicating that the virtual device 132 could not be transitioned to an active power state. This may indicate to the guest OS 131 and the VM 130 that the virtual device 132 or the physical device 105 is not available for access or use.

In one embodiment, if the hypervisor 111 determines that VM 120 or another VM (not illustrated in the figures) is currently accessing or using the physical device 105, the hypervisor 111 may pause (e.g., suspend, stop, etc.) the execution or operation of the VM 130. Suspending the execution or operation of the VM 130 may allow the VM 130 to wait until the physical device 105 is no longer used by other VMs. For example, suspending the execution or operation of the VM 130 may allow an application executing on the VM 130 that uses the virtual device 132 (and thus physical device 105) to continue executing with errors that may result from waiting for access to the physical device 105.

In one embodiment, if the hypervisor 111 determines that VM 120 or another VM (not illustrated in the figures) is currently accessing or using the physical device 105, the hypervisor 111, the hypervisor 111 may transmit a message to a user of the VM 130 to indicate that the physical device 105 could not be assigned to the VM 130. For example, the hypervisor 111 may transmit a chat message, an email message, etc., to the user of the VM 130. In another example, the hypervisor 111 may provide a message in a graphical user interface (GUI) that is presented, displayed, etc., to the user of the VM 130.

In one embodiment, if the hypervisor 111 determines that VM 120 or another VM (not illustrated in the figures) is currently accessing or using the physical device 105, the hypervisor 111, the hypervisor 111 may transmit a message to a user of the VM 120 to indicate that the VM 130 is requesting to use or access the physical device 105. For example, the hypervisor 111 may transmit a chat message, an email message, etc., to the user of the VM 130. In another example, the hypervisor 111 may provide a message in a graphical user interface (GUI) that is presented, displayed, etc., to the user of the VM 120. This may allow the user of the VM 120 to pause the execution or operation of the VM 120 or the service, application, process, etc., that is using the physical device 105. Pausing the execution or operation of the VM 120 or the service, application, process, etc., that is using the physical device 105 may allow the hypervisor 111 to assign the physical device 105 to the VM 130.

In one embodiment, if the hypervisor 111 determines that VM 120 or another VM (not illustrated in the figures) is currently accessing or using the physical device 105, the hypervisor 111, the hypervisor 111 may reassign the physical device 105 to the VM 130. For example, the hypervisor 111 may pause the execution or operation of the VM 120 (or other VM) and assign the physical device 105 to the VM 130. This may allow the VM 130 to access or use the physical device 105. The hypervisor 111 may also instruct the VM 120 or the guest OS 121 to stop using the virtual device 122 or to save device state information for the virtual device 122 (e.g., data such as buffer data, register values, the operations or actions that are being performed by the virtual device 122, etc.). This may allow the hypervisor 111 to reassign the physical device 105 back to the VM 120 at a later point in time. For example, after the VM 130 indicates that the VM 130 is requesting to transition the virtual device 132 to a reduced power state, the hypervisor 111 may reassign the physical device 105 to the VM 120 and the device state information may allow the VM 120 to continue the operations or actions that were being performed by the virtual device 122.

In one embodiment, if the hypervisor 111 determines that VM 120 or another VM (not illustrated in the figures) is currently accessing or using the physical device 105, the hypervisor 111, the hypervisor 111 may reassign the physical device 105 to the VM 130 after a threshold period of time has passed. For example, the hypervisor 111 may reassign the physical device 105 to the VM 130 after one minute, five minutes or some other appropriate period of time has passed. This may prevent a VM from using or accessing the physical device 105 for too long a period of time. For example, this may prevent a VM from monopolizing or blocking the use of the physical device 105. The hypervisor 111 may also instruct the VM 120 or the guest OS 121 to stop using the virtual device 122 or to save device state information for the virtual device 122 (e.g., data such as buffer data, register values, the operations or actions that are being performed by the virtual device 122, etc.) after the threshold period of time has elapsed.

In one embodiment, if the hypervisor 111 determines that VM 120 or another VM (not illustrated in the figures) is currently accessing or using the physical device 105, the hypervisor 111 may periodically analyze power state information to determine whether the physical device 105 is available. For example, the hypervisor 111 determine whether a later message is received from the VM 120 (or other VM) indicating that the VM 120 is transitioning the virtual device 122 to a reduced power state. In another example, the hypervisor 111 may periodically poll the VM 120 to determine whether the VM 120 is transitioning the virtual device 122 to a reduced power state. If the hypervisor 111 determines at a later point in time that the VM 120 is no longer using the physical device 105 (e.g., the VM 120 transitions the virtual device 122 to a reduced power state), the hypervisor 111 may reassign the physical device to the VM 130. If the hypervisor 111 determines at a later point in time that the VM 120 is still using the physical device 105, the hypervisor 111 may continue to periodically analyze power state information to determine whether the physical device 105 is available.

In some embodiments, multiple VMs may request to use or access the physical device 105. For example, VM 120 may be currently using the physical device 105 and VM 130 and another VM (not illustrated in the figures) may request to use or access the physical device 105. The hypervisor 111 may use a queue, lists, etc., to determine which VMs are waiting to use or access the physical device 105. When VM 120 finishes using the physical device 105, the hypervisor 111 may identify a next VM to use or access the physical device 105 based on various parameters or criteria. For example, the hypervisor 111 may identify the VM that has the earliest request to use or access the physical device 105. In another example, the hypervisor 111 may prioritize certain VMs because the certain VMs are performing more important actions or operations using the physical device 105.

In one embodiment, the virtual devices 122 and 132 may be para-virtualized devices. A para-virtualized device may be a device that may be able to communicate with a physical device (associated with the para-virtualized device) directly via a para-virtualized device driver. This may allow a guest OS to query the physical device to determine if the physical device is currently in use. For example, virtual device 122 may be a para-virtualized device and guest OS 121 may use para-virtualized device drivers to directly communicate with physical device 105 to determine whether the physical device 105 is currently being used. If the physical device 105 is not being used, the guest OS 121 may transition the virtual device 122 to an active power state. If the physical device 105 is being used, the guest OS 121 may not attempt to transition the virtual device 122 to an active power state.

Although the present disclosure may refer to virtual machines, the embodiments, examples, implementations, etc., described herein may apply to other types of virtual environments. For example, another type of virtual environment may be a container executing on a computing device. In one embodiment, the container may be an isolated set of resources allocated to executing an application, software, and/or process independent from other applications, software, and/or processes. A host OS may use namespaces to isolate the resources of the containers from each other. In another embodiment, the container may be a virtualized object similar to virtual machines. However, container may not implement separate guest OS (like VMs 120 and 130 illustrated in FIG. 1). The container may share the kernel, libraries, and binaries of the host OS other containers that are executing on the computing device. In one embodiment, a host OS may include a container engine which may allow different containers to share the host OS (e.g., the OS kernel, binaries, libraries, etc.) of the computing device. For example, the container engine may multiplex the binaries and/or libraries of the host OS between multiple containers. The container engine may also facilitate interactions between the container and the resources of the computing device. For example, the container engine may manage requests from container to access a memory (e.g., a RAM) of the computing device. In another example, the container engine may manage requests from the container to access certain libraries/binaries of the host OS. In other embodiments, the container engine may also be used to create, remove, and manage containers. In one embodiment, the container engine may be a component of a host operating system. In another embodiment, container engine may run on top of a host operating system, or may run directly on host hardware without the use of a host operating system.

Figure 2:
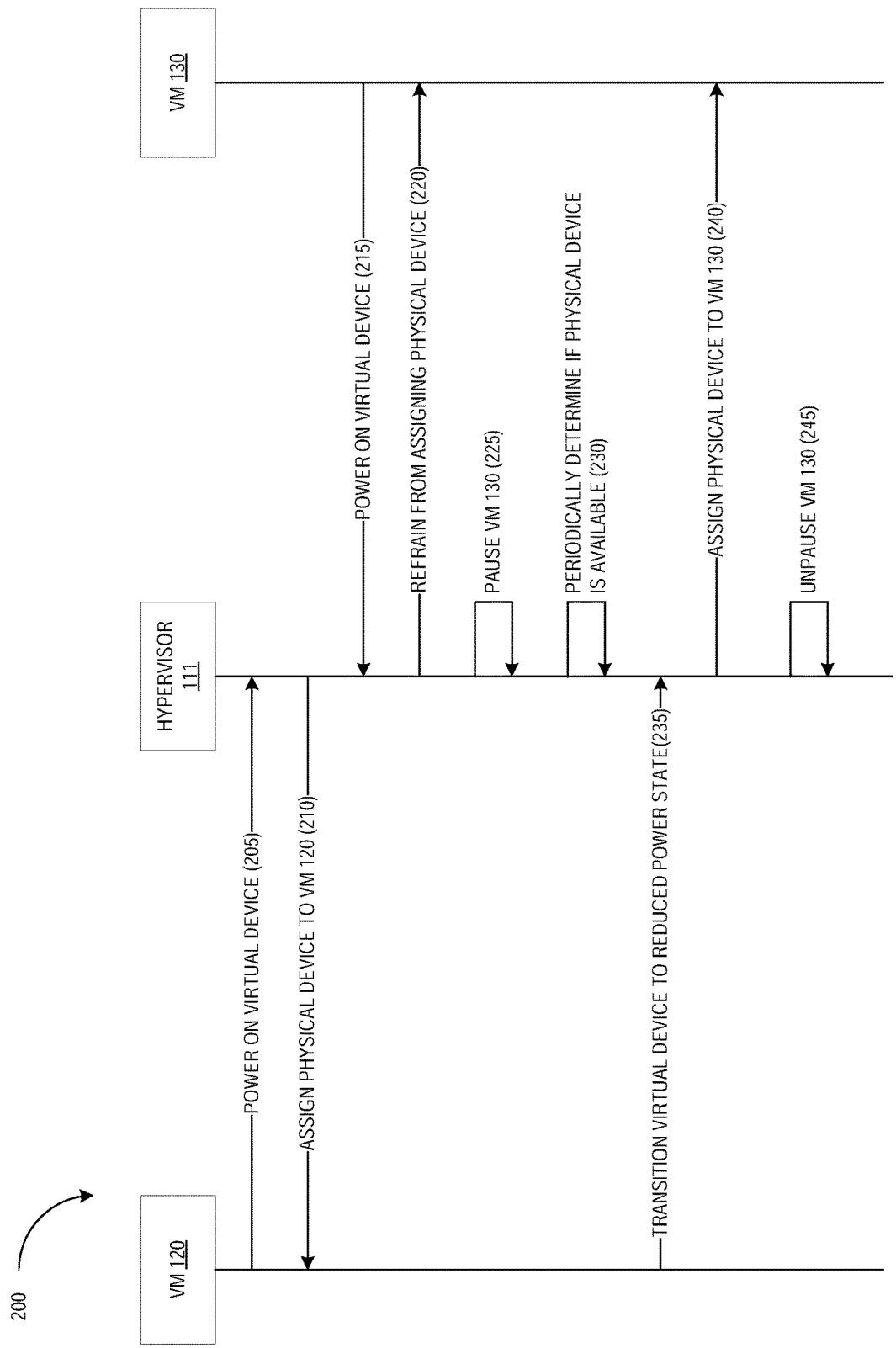
FIG. 2 is a sequence diagram illustrating example actions that may be performed by virtual machines and a hypervisor, in accordance with one or more embodiments of the present disclosure.

FIG. 2 is a sequence diagram illustrating example actions that may be performed by virtual machines 120 and 130, and a hypervisor 111, in accordance with one or more embodiments of the present disclosure. The actions illustrated in the sequence diagram 200 may be performed when the hypervisor 111 allows the VMs 120 and 130 to share a physical device (e.g., physical device 105 illustrated in FIG. 1).

At block 205, the VM 120 may power on a first virtual device (e.g., virtual device 122 illustrated in FIG. 1). For example, when the VM 120 boots (e.g., when the guest OS 121 boots or starts), the VM 120 may transmit a message or data indicating that the first virtual device is powering on. At block 210, the hypervisor 111 may assign the physical device to the VM 120 and the physical device may be associated with the first virtual device. At block 215, the VM 130 may power on a second virtual device (e.g., virtual device 132 illustrated in FIG. 1). For example, when the VM 120 boots (e.g., when the guest OS 121 boots or starts), the VM 120 may transmit a message or data indicating that the second virtual device is powering on. The hypervisor 111 may refrain from assigning the physical device to VM 130 at block 220. For example, the hypervisor 111 may deny the VM 130 access to the physical device 105. At block 225, the hypervisor 111 may also pause the VM 130. For example, the hypervisor 111 may pause, stop, halt, etc., the execution of the VM 130.

At block 230, the hypervisor 111 may periodically determine if the physical device is available (e.g., has become available). For example, the hypervisor 111 may wait to receive a message from the VM 120 indicating that the VM 120 is transitioning the first virtual device to a reduced power state. At block 235, the VM 120 may transition the first virtual device to a reduced power state. For example, the VM 120 may not use the first virtual device for a period of time and may transition the first virtual device to a reduced power state. At block 240, the hypervisor 111 may receive the message from the VM 120 or may intercept the message from the VM 120 indicating that the first virtual device has been transitioned to a reduced power state. At block 240, the hypervisor 111 may assign the physical device to the VM 130. The hypervisor 111 may also un-assign the physical device from the VM 120. At block 245, the hypervisor 111 may un-pause the VM 120.

Figure 3A:
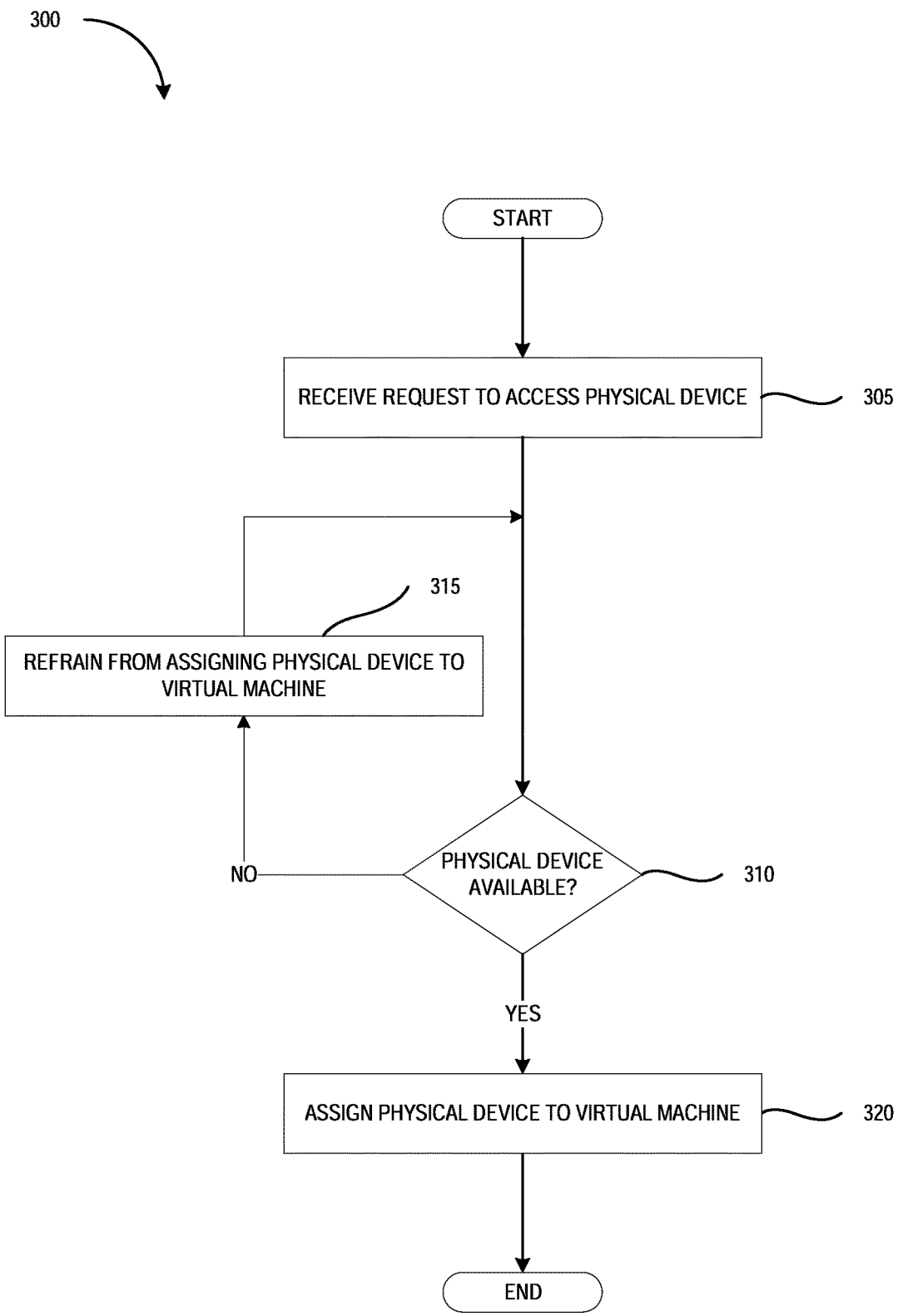
FIG. 3A is a flow diagram of a method of sharing a physical device between multiple virtual machines, in accordance with some embodiments of the present disclosure.

FIG. 3A is a flow diagram of a method of sharing a physical device between multiple virtual machines, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by a hypervisor (e.g., hypervisor 111 illustrated in FIG. 1) and/or a computing device (e.g., computing device 100 illustrated in FIG. 1).

At block 305, the method 300 may receive a request to access a physical device. For example, the method 300 may receive a message indicating that a first virtual machine is transitioning a first virtual device to an active power state and the first virtual device may be associated with the physical device. The physical device may also be associated with other virtual devices of other virtual machines simultaneously. At block 310, the method 300 may determine whether the physical device is available based on power state information associated with the physical device. For example, the method 300 may determine whether another virtual machine has already transitioned a respective virtual device to an active power state and whether that virtual device is still in the active power state based on a table, such as Table 1. If another virtual machine is currently using the physical device, the method 300 may refrain from assigning the physical device to the virtual machine at block 315. For example, the method 300 may pause the virtual machine and may not assign the physical device to the virtual machine. The method 300 may proceed back to block 310 where the method 300 may periodically determine whether the physical device is available. If the physical device is available, the method 300 may assign the physical device to the virtual machine at block 320.

Figure 3B:
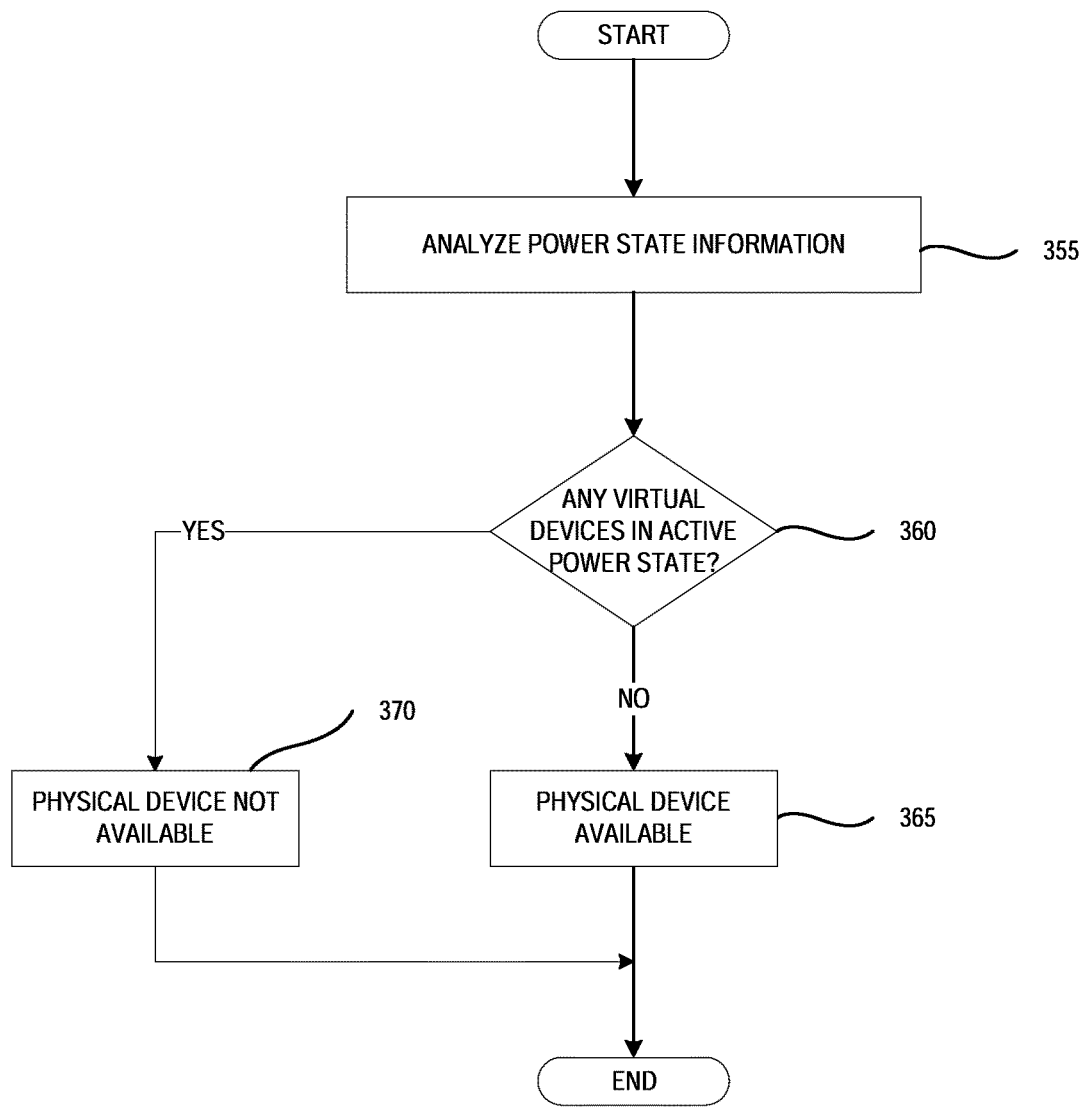
FIG. 3B is a flow diagram of a method of determining whether a physical device is available, in accordance with some embodiments of the present disclosure.

FIG. 3B is a flow diagram of a method 350 of determining whether a physical device is available, in accordance with some embodiments of the present disclosure. Method 350 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 350 may be performed by a hypervisor (e.g., hypervisor 111 illustrated in FIG. 1) and/or a computing device (e.g., computing device 100 illustrated in FIG. 1).

At block 355, the method 350 may analyze power state information associated with a physical device. For example, the method 350 analyze a table (similar to Table 1 illustrated above) to identify all of the virtual devices that are associated with the physical device. The method 350 may also analyze the table to determine the current power state of all of the virtual devices that are associated with the physical device. At block 360, the method 350 may determine whether any of the virtual devices that are associated with the physical device are in an active power state (e.g., state D0 of the ACPI standard). If any of the virtual devices that are associated with the physical device are in an active power state, the method 350 determines that the physical device is not available at block 370. If none of the virtual devices that are associated with the physical device are in an active power state (e.g., all of the virtual devices that are associated with the physical device are in a reduced power state, such as states D1 through D3 of the ACPI standard), the method 350 determines that the physical device is available at block 365.

Figure 4:
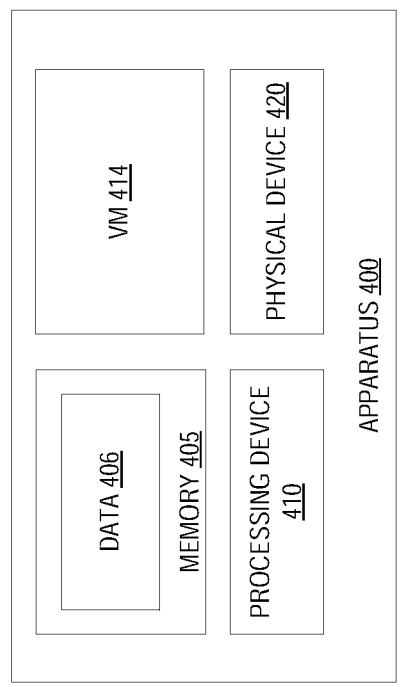
FIG. 4 is a block diagram of an example apparatus that may perform one or more of the operations described herein, in accordance with some embodiments.
Figure 5:
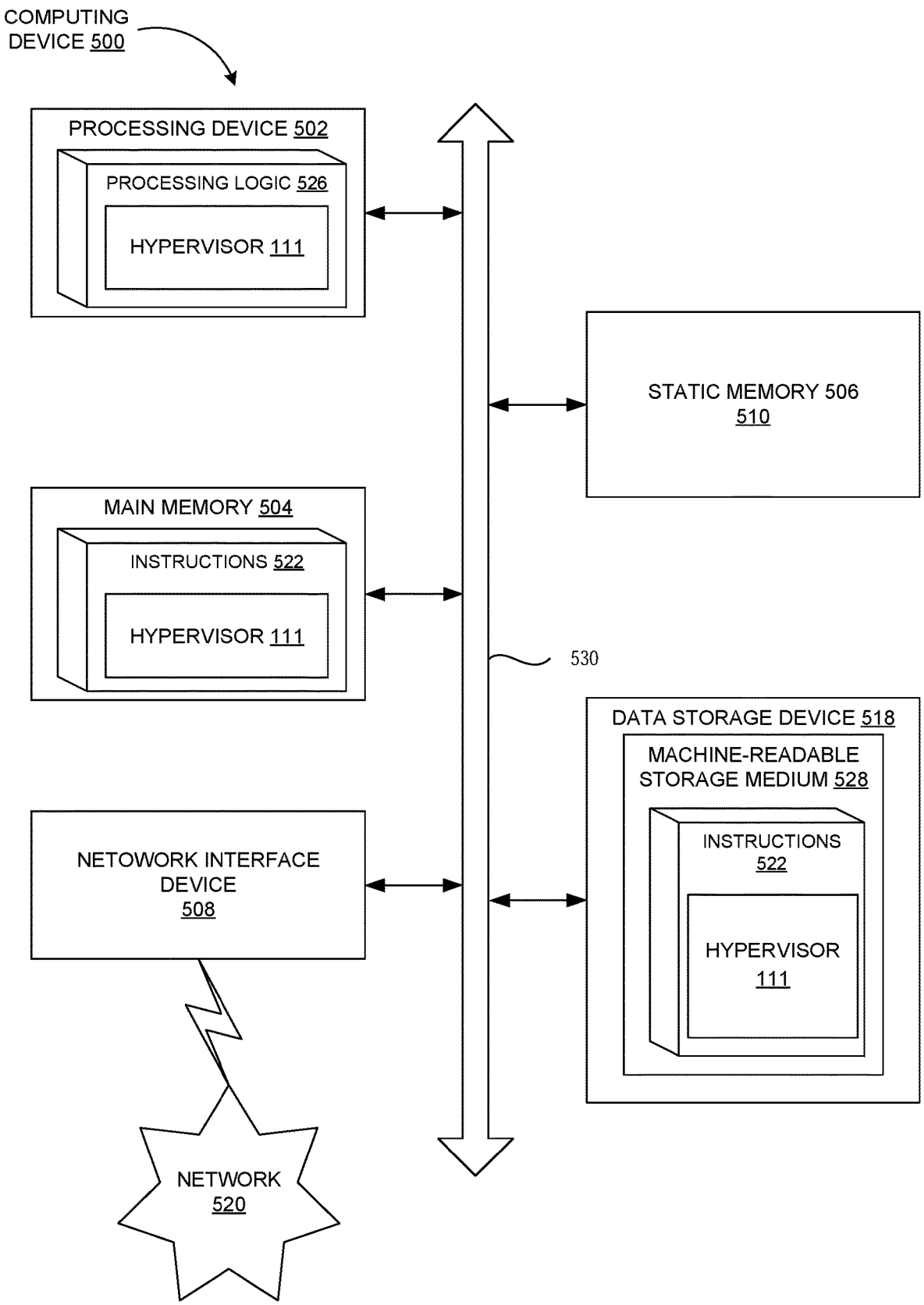
FIG. 5 is a block diagram of an example computing device that may perform one or more of the operations described herein, in accordance with some embodiments of the present disclosure.

FIG. 4 is a block diagram of an example apparatus 400 that may perform one or more of the operations described herein, in accordance with some embodiments. The apparatus 400 may be an example of a computing device. The apparatus 400 includes a memory 405 to store data 406. The apparatus 400 also includes a processing device 410 operatively coupled to the memory 405. The processing device 410 may receive, from a first virtual machine, a request to access a physical device 420 of a computing device. The processing device 410 may also determine whether the physical device 420 of the computing device is available in view of power state information associated with the physical device 425 of the computing device. In response to determining that the physical device of the computing device is available, the processing device 410 may assign the physical device to the first virtual machine FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of node, such as node 131 illustrated in FIG. 1.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of hypervisor 111 of FIG. 1, for performing the operations and steps discussed herein.

The data storage device 518 may include a non-transitory machine-readable storage medium 528, on which is stored one or more set of instructions 522 (e.g., software) embodying any one or more of the methodologies of functions described herein, including instructions to cause the processing device 502 to execute hypervisor 111. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The non-transitory machine-readable storage medium 528 may also be used to store instructions to perform a method for multi-level task debugging, as described herein. While the non-transitory machine-readable storage medium 528 is shown in an exemplary embodiment to be a single medium, the term "non-transitory machine-readable storage medium" should be taken to include a single medium or multiple media (e.g., a centralized or distributed database, or associated caches and servers) that store the one or more sets of instructions. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the non-transitory machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method implemented with a processing device coupled memory-stored instructions which, when executed by the processing device, cause the processing device to perform the method, comprising:
   receiving, from a first virtual machine, a request to access a physical device of a computing device;
   determining, by the processing device, whether the physical device of the computing device is available in view of power state information associated with the physical device of the computing device,
   wherein the power state information is received from one or more other virtual machines of the computing device; and
   in response to determining that the physical device of the computing device is available, assigning the physical device to the first virtual machine.

2. The method of claim 1, wherein receiving the request to access the physical device of the computing device comprises:
   receiving from the first virtual machine, a second power state information indicating a second request to transition a virtual device of the first virtual machine to an active power state, wherein the virtual device is associated with the physical device of the computing device.

3. The method of claim 1, wherein determining whether the physical device of the computing device is available comprises:
   determining whether any virtual devices of the first virtual machine and the one or more other virtual machines are in an active power state, based on the power state information; and
   in response to determining that no virtual devices of the first virtual machine and the one or more other virtual machines are in an active power state, determining that the physical device is available.

4. The method of claim 1, further comprising:
   in response to determining that the physical device of the computing device is not available, providing a message to the first virtual machine indicating that the physical device of the computing device is not available.

5. The method of claim 1, further comprising:
   in response to determining that the physical device of the computing device is not available, denying the first virtual machine access to the physical device of the computing device is not available.

6. The method of claim 1, further comprising:
   in response to determining that the physical device of the computing device is not available, reassigning the physical device of the computing device to the first virtual machine.

7. The method of claim 6, wherein a number of virtual machines that can share the physical device is not limited by the physical device.

8. The method of claim 1, further comprising:
   in response to determining that the physical device of the computing device is not available, providing a message to a user indicating that the first virtual machine is requesting access to the physical device of the computing device.

9. The method of claim 1, further comprising:
in response to determining that the physical device of the computing device is not available:
periodically analyzing the power state information to determine whether the physical device of the computing device is available; and
reassigning the physical device of the computing device to the first virtual machine.

10. An apparatus, comprising:
a memory to store data;
a processing device operatively coupled to the memory, the processing device to:
receive, from a first virtual machine, a request to access a physical device of a computing device;
determine, by a processing device, whether the physical device of the computing device is available in view of power state information associated with the physical device of the computing device, wherein the power state information is received from one or more other virtual machines of the computing device; and
in response to determining that the physical device of the computing device is available, assign the physical device to the first virtual machine.

11. The apparatus of claim 10, wherein to receive the request to access the physical device of the processing device is further to:
receive from the first virtual machine, a second power state information indicating a second request to transition a virtual device of the first virtual machine to an active power state, wherein the virtual device is associated with the physical device of the computing device.

12. The apparatus of claim 10, wherein to determine whether the physical device of the computing device is available the processing device is further to:
determine whether any virtual devices of the first virtual machine and the one or more other virtual machines are in an active power state, based on the power state information; and
in response to determining that no virtual devices of the first virtual machine and the one or more other virtual machines are in an active power state, determine that the physical device is available.

13. The apparatus of claim 10, wherein the processing device is further to:
in response to determining that the physical device of the computing device is not available, providing a message to the first virtual machine indicating that the physical device of the computing device is not available.

14. The apparatus of claim 10, wherein the processing device is further to:
in response to determining that the physical device of the computing device is not available, denying the first virtual machine access to the physical device of the computing device is not available.

15. The apparatus of claim 10, wherein the processing device is further to:
in response to determining that the physical device of the computing device is not available, reassign the physical device of the computing device to the first virtual machine.

16. The apparatus of claim 15, wherein a number of virtual machines that can share the physical device is not limited by the physical device.

17. The apparatus of claim 10, wherein the processing device is further to:
in response to determining that the physical device of the computing device is not available, provide a message to a user indicating that the first virtual machine is requesting access to the physical device of the computing device.

18. The apparatus of claim 10, wherein the processing device is further to:
in response to determining that the physical device of the computing device is not available:
periodically analyze the power state information to determine whether the physical device of the computing device is available; and
reassign the physical device of the computing device to the first virtual machine.

19. A non-transitory computer-readable storage medium including instructions that, when executed by a processing device, cause the processing device to:
receive, from a first virtual machine, a request to access a physical device of a computing device;
determine, by the processing device, whether the physical device of the computing device is available in view of power state information associated with the physical device of the computing device, wherein the power state information is received from and one or more other virtual machines of the computing device;
in response to determining that the physical device of the computing device is available, assign the physical device to the first virtual machine.

20. The non-transitory computer-readable storage medium of claim 19, wherein:
the power state information comprises data indicating that a second virtual machine has transitioned a virtual device of the second virtual machine to a reduced power state;
the reduced power state indicates that the second virtual machine is no longer using the virtual device; and
the virtual device is as associated with the physical device of the computing device.

* * * * *